June 2, 1953  E. J. SCRAY, SR  2,640,361
LEVEL CONTROL
Filed Feb. 7, 1950  2 Sheets-Sheet 1

Eugene J. Scray, Sr.
INVENTOR.

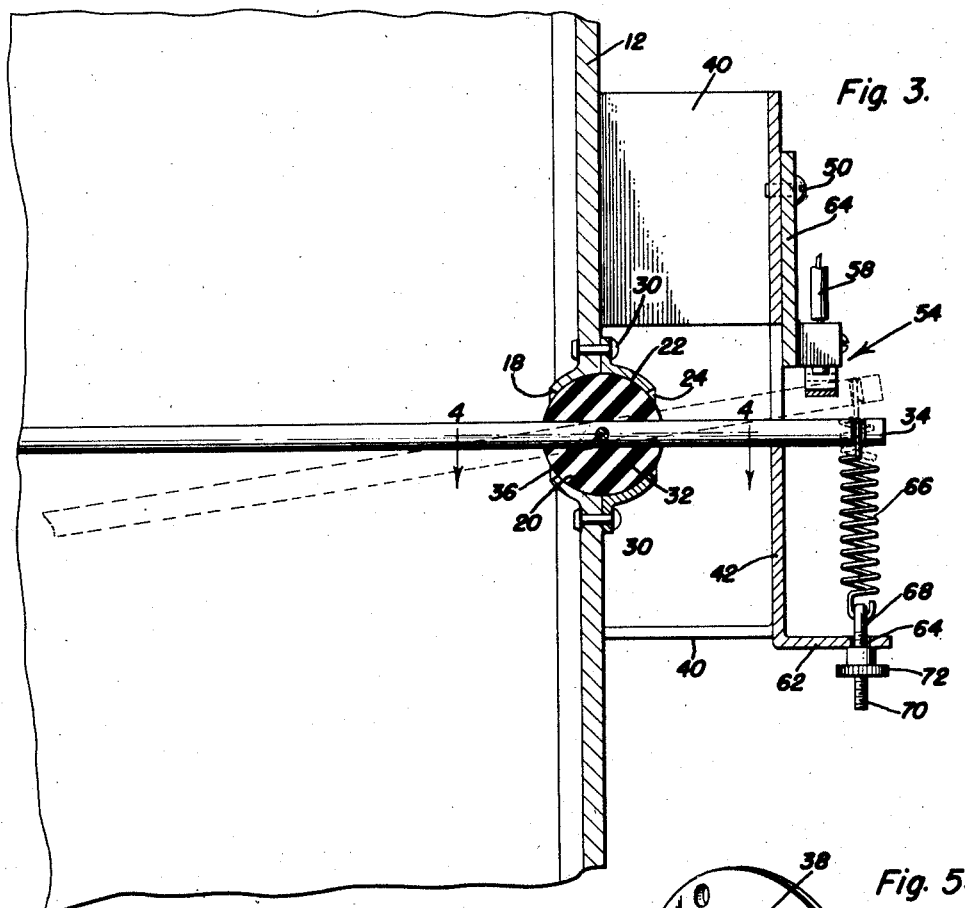
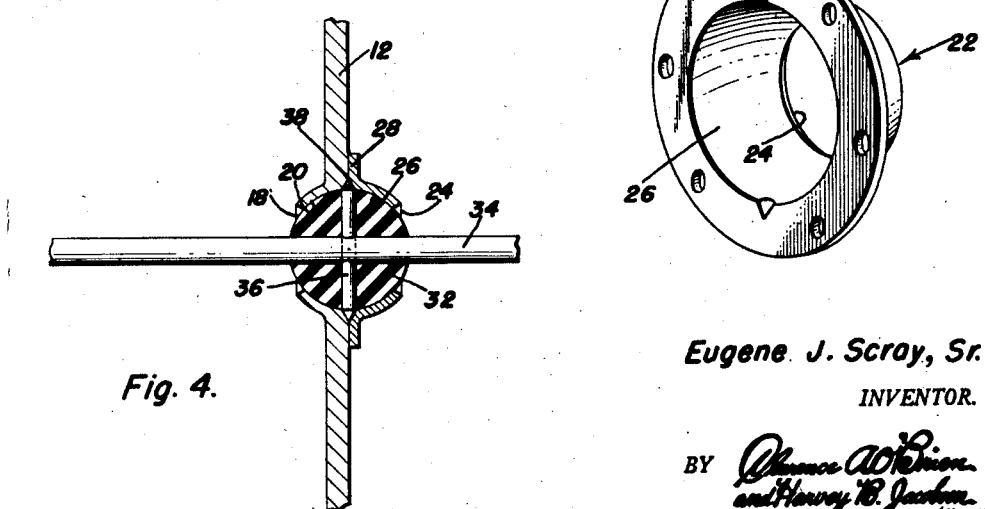
Eugene J. Scray, Sr.
INVENTOR.

UNITED STATES PATENT OFFICE 2,640,361

LEVEL CONTROL

Eugene J. Scray, Sr., Bound Brook, N. J.

Application February 7, 1950, Serial No. 142,730

3 Claims. (Cl. 74—18)

This invention relates generally to devices for indicating through direct dial instruments or otherwise through electrical circuits the level or quantity of solid or liquid material in storage bins or receptacles, and more particularly pertains to means for transmitting oscillatory movement through walls while not permitting leakage therethrough.

The primary object of this invention is to indicate the quantity of a material in a receptacle.

Another important object of this invention is to provide a device of this character in which the quantity of material sensing means extends through the receptacle wall and transmits its function through the wall by oscillation about a fulcrum situated in the wall, in which leakage of material is not permitted through the wall about the sensing means.

Another important object of this invention in conformity with the foregoing objects is to provide a device of this character in which the oscillation of the sensing means is confined to a single plane for accuracy in the indication given by the instrument.

Another important object of this invention, in conformity with the foregoing objects, is to provide a device of this character in which the means provided for preventing leakage also resiliently urges the sensing means to a neutral position.

A meritorious feature of the present invention resides in the formation of the seat for the resilient, sealing means in the side wall of the receptacle and the annular retaining means for the same, together with means for adjustably clamping the resilient means in position.

Another important feature of the present invention resides in the means for confining the movement of the sensing arm or lever to a single plane, which includes the slot in the bracket and the pivot pin connection between the wall and the sensing arm.

A final important feature of the present invention to be specifically recited herein resides in the provision of electrical means including a switch for indicating the position of the arm and the protection afforded the sensing unit from foreign material.

These, together with various ancillary features and objects of the invention which will later become apparent as the following description proceeds, are attained by the present invention, a preferred embodiment of which has been illustrated by way of example in the accompanying drawings, wherein:

Figure 3 is a vertical transverse sectional view of the present invention, being taken upon the plane of the section line 3—3 of Figure 2;

Figure 4 is a horizontal transverse sectional view, being taken substantially upon the plane of the section line 4—4 of Figure 3; and, Figure 5 is a perspective view of the annular retaining member.

Figure 1:
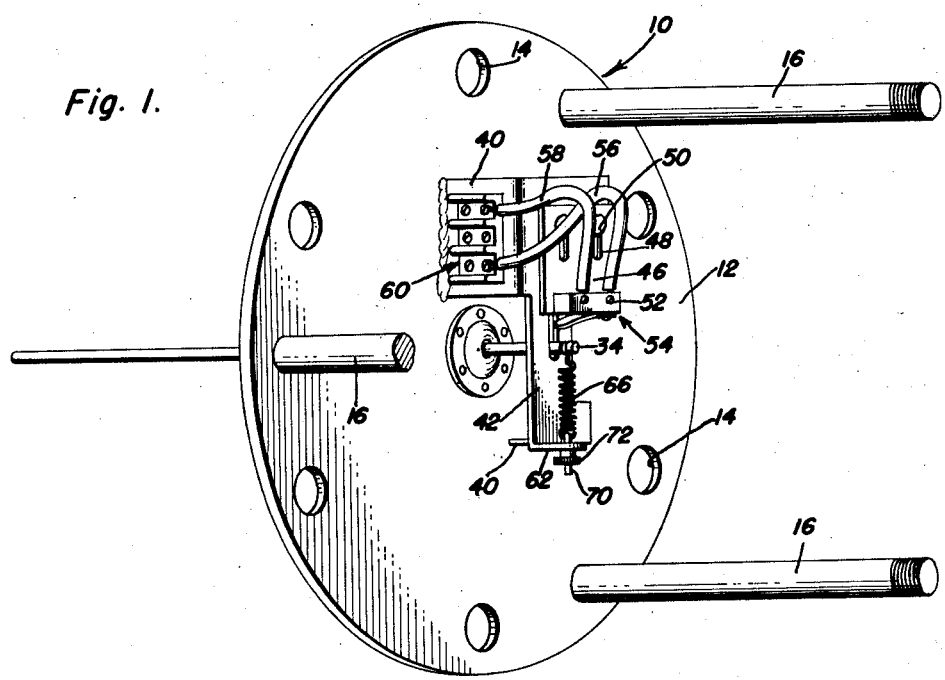
Figure 1 is a perspective view of the indicating portion of the present invention with the protective covering removed.
Figure 2:
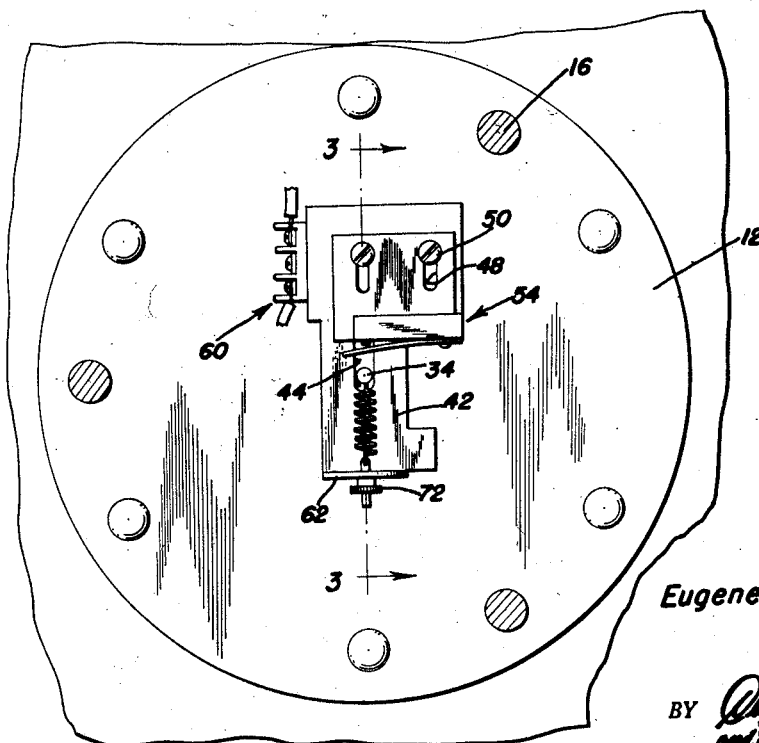
Figure 2 is a side elevational view of the rear of the present invention, with the protective covering removed and illustrating particularly the electric switch assembly.

Reference is now made more specifically to the accompanying drawings, wherein like numerals designate similar parts throughout the various views, and in which the reference numeral 10 designates generally the level indicating assembly.

The assembly 10 includes a plate 12, which is preferably round and provided with a plurality of circumferentially spaced openings 14 through which by means of bolts or the like the plate 12 may be secured in a receptacle wall, not shown, through which also by means of stud 16 a protective covering means, not shown, may be secured to the front of the plate 12 as will be readily understood, but which has not been illustrated in the drawings for the purpose of clarity of the invention.

The plate 12 is provided with an opening 18, as shown in Figures 3 and 4, about which the plate 12 is concave at 20 to form a spherical seat for a purpose to presently appear.

An annular retaining member 22 is provided having an opening 24 therethrough, which is concaved at 26 to form a spherical seat, and which is provided with a peripheral flange 28. The flange 28 is secured to the plate 12 by means of bolt fasteners 30, by means of which the annular member 22 may be adjustably clamped to the plate 12 for a purpose to presently appear.

A resilient sphere 32, formed of a material such as rubber or plastic, is disposed between the plate 12 and the member 22 and is seated in the concaved portions 20 and 26 of the plate 12 and member 22 respectively, being adjustably clamped therein by means of the fasteners 30. A sensing arm or lever 34 extends through the openings 18 and 24 as well as the sphere 32, and which is spaced from the plate 12 and the member 22, so as to permit oscillatory movement of the arm 34. A removable pin 36 extends transversely through an opening in the arm 34 and the sphere 32 to constitute oppositely extending pivot pins from the arm 34 which pin 36 is pointed at its opposite ends and rotatably received in complementary, diametrically opposed recesses 38 formed in the plate 12 and the member 22, so as to limit oscillatory movement of the arm 34 to a single plane. It will be understood that when the plate 12 and the member 22 are tightly gripping the sphere 32 that the resilient nature of the sphere 32 will resiliently urge the arm 34 to a neutral position. It will be readily appreciated that the element 32 need necessarily only be symmetrical about a plurality of planes passing through the axis defined by the pin 36, rather than spherical and that the pivot pin connection between the plate 12 and the member 32 could be from the plate 12 rather than from the member 22, in which instance the member 32 could be non-resilient and in sliding contact with the plate 12 and the member 22 and the same should be properly considered within the scope of the present invention, it being obvious that either of these alternative constructions is such that leakage through the plate 12 about the arm 34 is not permitted and the arm 34 is permitted oscillatory movement through the plate 12 in a single plane for a purpose to presently appear.

Secured by means of legs 40 to the plate 12 is a switch support bracket 42, which is provided with a guide slot 44 that is perpendicular to the axis defined by the pivot pin 36, and through which the arm 34 extends. A switch support plate 46 is adjustably positioned on the bracket 42 by means of slots 48 provided therein and fasteners 50. Suitably secured to the switch support plate 46 by means of fasteners 52 is a switch unit, indicated generally by the numeral 54, that is disposed to be actuated by the arm 34 moving in the slot 44, as will be readily seen in Figure 1. Electrical conduits 56 and 58 are operatively connected to the switch unit 54 and to a contact terminal plate assembly 60 carried by one of the legs 40. An ear 62 extends from one end of the bracket 42 that is provided with an aperture 64 therethrough. A retractile spring 66 has one end connected to the arm 34 and the other end connected to an eye bolt 68 which extends through the aperture 64, and which eye bolt is threaded as at 70 to receive a knurled nut 72 for adjustably tensioning the spring 66 as will be readily understood upon reference to Figure 3. It will be appreciated that the adjustability of the plate 46 and the spring 66 permits the arm 34 to actuate the switch 54 upon not only predetermined amount of movement of the arm 34 but also upon a predetermined force upon the arm 34 at the end opposite the spring 66. As is customary in devices of this character, the end of the arm 34 opposite the spring 66 is provided with suitable means, not shown, such as a spoon, elongated transverse cylinder (hollow in the case of liquids for the buoyancy effect thereof), paddle or the like for sensing the level or quantity of material disposed in a receptacle of which the plate 12 forms a portion of the side wall thereof, but which is not shown as the same does not form the subject matter of this invention, and since the mere elongation of the arm 34 will serve the purpose when the level of coal in a receptacle or bin is being indicated. As stated hereinbefore, a protective cover, not shown, is secured to the plate 12 by means of the bolt 16 for the purpose of sheltering the electrical switch assembly from access by foreign materials, and through which electrical lead wires may extend from the electrical terminals at 60 to a suitable indicating or warning device, as will be readily apparent.

It will be readily understood that the present invention provides means for transmitting oscillatory movement through the side wall of a receptacle that is confined to a single plane and which will not permit the leakage of material through the receptacle together with means for indicating by means of an electrical switch and in an associated electrical circuit, not shown, when the level of a material in a receptacle has reached a predetermined position. It will be obvious that a direct level indicating instrument could be incorporated with the spring 66, responsive to the tension placed on the spring 66, if it is desired to indicate directly at all times the level of the material within the receptacle as will be readily understood by those skilled in the art.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. An article of manufacture comprising a plate having an opening therethrough, a substantially spherical resilient member in said opening, clamping means for removably clamping said member to said plate, said member being firmly secured to and in sealing engagement with said plate, an arm extending through said opening and said member, said arm being firmly secured to and in sealing engagement with said member and spaced from said plate for oscillatory movement therethrough upon flexing movement of said member, means for limiting oscillation movement of said arm to a single plane; said last means including oppositely extending pivot pins on said arm and also extending through said member, said plate having recesses formed in the walls defining said opening, said recesses rotatably receiving the outer ends of said pins.

2. An article of manufacture comprising a plate having an opening therethrough, said plate being concaved about said opening and forming a substantially spherical seat, an annular retaining member having an opening registering with the opening in said plate, said retaining member being concaved about its opening and forming a substantially spherical seat, a radially extending flange on said retaining member, a substantially spherical resilient element received between the plate and the retaining member and engaging said spherical seats, said retaining member being rigidly secured to said plate to secure said resilient element in sealing relation to said plate, a lever extending through said openings and said resilient element, said lever being firmly secured to and in sealing engagement with said resilient element, said lever being spaced from said openings for oscillatory movement, a guide plate having a slot therein controlling the direction of said oscillatory movement.

3. An article of manufacture comprising a plate having an opening therethrough, said plate being concaved about said opening and forming a substantially spherical seat, an annular retaining member having an opening registering with said opening in said plate, said retaining member being concaved about its opening and forming a substantially spherical seat, a radially extending flange on said retaining member, a substantially spherical resilient element received between the plate and the retaining member and engaging said spherical seats, said retaining member being rigidly secured to said plate to secure said resilient element in sealing relation to said plate, a lever extending through said openings and said resilient element, said lever being firmly secured to and in sealing engagement with said resilient element, said lever being spaced from said openings for oscillatory movement, a guide plate having a slot therein controlling the direction of said oscillatory movement, a pivot pin extending transversely through said lever and diametrically opposed bearing recesses at the junction between said plate and said retaining member, the ends of said pivot pin being mounted in said recesses.

EUGENE J. SCRAY, Sr.

References Cited in the file of this patent

UNITED STATES PATENTS

| Number | Name | Date |
|---|---|---|
| Re. 20,380 | Hickstein et al. | May 25, 1937 |
| 558,262 | Darling | Apr. 14, 1896 |
| 1,058,178 | Hart | Apr. 8, 1913 |
| 1,857,643 | Kinyon | May 10, 1932 |
| 1,940,895 | Wacker | Dec. 26, 1933 |
| 2,100,642 | Geyer | Nov. 30, 1937 |
| 2,397,978 | Paulus | Apr. 9, 1946 |
| 2,428,246 | Scifres | Sept. 30, 1947 |

FOREIGN PATENTS

| Number | Country | Date |
|---|---|---|
| 560,427 | Great Britain | Apr. 4, 1944 |